FORMAT CONTROL IN A CHARACTER RECOGNITION SYSTEM

Filed Oct. 3, 1967 3 Sheets-Sheet 1

INVENTORS
WILLIAM W. HARDIN
PATRICK J. TRAGLIA
BY Homer L. Knearl
AGENT

FORMAT CONTROL IN A CHARACTER RECOGNITION SYSTEM

Filed Oct. 3, 1967

3 Sheets-Sheet 2

United States Patent Office 3,553,646
Patented Jan. 5, 1971

3,553,646

FORMAT CONTROL IN A CHARACTER RECOGNITION SYSTEM

William W. Hardin, Stewartville, and Patrick J. Traglia, Rochester, Minn., assignors to International Business Machines Corporation, Armonk, N.Y., a corporation of New York Filed Oct. 3, 1967, Ser. No. 672,551
Int. Cl. G06k 7/015
U.S. Cl. 340—146.3 16 Claims

ABSTRACT OF THE DISCLOSURE

A character recognition system is completely controlled by a digital control word from a computer. The control word contains start and end of field addresses plus recognition method codes, a calibration command, a character field orientation command, a correction command, a numeric or alphabetic recognition command and a blank area command. All of this information in the control word from the computer permits great versatility in operation of a character recognition system. The versatility is achieved by the fact that the format of scanning in the character recognition system can be completely altered as to area of scan and type of recognition by a digital control word from the computer. By changing the computer program, the format of the character recognition system is changed.

In operation, the start and end of field addresses in the control ward from the computer are converted to analog signals by digital to analog converters for use in the scanning circuitry of the character recognition system. The recognition mode as coded in the control word is decoded by logic. The logic then signals the scanning system and the recognition logic the type of scan pattern and recognition to be used in analyzing the character field to be scanned. Another part of the control word is decoded to signal the recognition circuits whether to look for alphabetic or numeric characters. Still another part of the control word is decoded to signal the recognition circuits to look for large blank areas between characters scanned. Another portion of the control word is used to indicate to the scanning circuits the orientation of the character field to be scanned. Finally, a last portion of the control word is used to tell the recognition system whether to select on-line or off-line correction when reject characters are indicated.

BACKGROUND OF THE INVENTION

This invention relates to format control apparatus for use in a character recognition system. More particularly, the apparatus of the invention receives format control words from a data processor and uses these format control words to completely control the operation of a character recognition system.

The recent trend in character recognition systems is to use format control to achieve great versatility as to the types of documents and format of documents which a single character recognition system may scan. Commonly assigned Patent 3,337,766 teaches such a format control system dealing with calibrating a scanner to the position of an indexed document to be scanned, and also dealing with start of field addresses and end of field addresses and also with selecting modes of scanning. The present invention constitutes an improvement of these areas in that it has digitized these operations thereby simplifying the communication between the character recognition system and a data processor and also simplifying the storage of the format control information. The storage is simplified in that it is easier to store digital signals than to store analog signals as were used in the above cited patent.

In addition, the present invention has advanced the art a great deal further in that it also provides for format control in the area of selecting different recognition operations, selecting different orientation of character fields for scanning, selecting whether to scan for alphabetic or numeric characters in a field, selecting whether to make off-line or on-line corrections of rejects, and selecting when to look for blank areas in a character field.

SUMMARY OF THE INVENTION

The invention is accomplished by providing registers and decoding logic to store and decode the format control word as received from a computer and thereafter use the decoded signals to control the operation of the character recognition system. In one aspect of the invention, the control word is a digital word which may be converted into scan address signals by a digital to analog converter. In another aspect of the invention, the calibration of the scanning addresses to an indexed document, is accomplished by digital latches and digital-to-analog converters. Use of digital storage permits the calibration apparatus to indefinitely store the correction factor during scanning of a document.

As another feature of the invention, the format control word contains information specifying the rotation or orientation of characters in a field to be scanned. This rotation information is used to angularly shift the scanning signals so as to adjust them to the orientation of the characters to be scanned. In another aspect of the invention, the control word tells the character recognition system whether to expect alphabetic or numeric characters in a character field. This information in the control word is stored and passed to the recognition circuits and the character recognition system whereby the recognition circuits may be greatly simplified.

In another aspect of the invention, an off-line or on-line correction signal is received in the control word and this correction information is stored and used to gate the character recognition system into one of two character correction modes. In an off-line correction mode, the character recognition system passes documents with rejects thereon to an off-line correction storage hopper after they are scanned. In an on-line correction mode, the character recognition system displays a character as it is scanned and indicated as a reject and permits the operator to key in a correction from the display. In a final aspect of the invention, the control word contains blank area information which is stored. This blank area information tells the character recognition circuits whether to look for blanks between characters in a character field. This permits the recognition system to scan the character field faster because it scans rapidly through blank areas.

The great advantage of this format control system is that virtually all aspects of a character recognition system are controlled by format control word from a computer. Accordingly, the system is extremely flexible. The system may be programmed to recognize many different types of character fonts, to recognize the character fonts when oriented in different directions, recognize selectively alphabetic or numeric character fields, to use different scan patterns for various types of characters and make other selective decisions such as on-line or off-line correction and whether to look for blank areas. The importance is that a control word from a computer specifies all of these functions to the character recognition system. Therefore, to adjust to different formats of the documents as to types of character orientation, etc., one need only re-program the computer to control the character recognition system in the desired manner. The simplicity of this operation when compared to redesigning hardware to handle each special job is of tremendous practical value. The foregoing and other features and advantages of the invention will be apparent from the following more particular description of a preferred embodiment of the invention, as illustrated in the accompanying drawings.

DESCRIPTION

Figure 1:
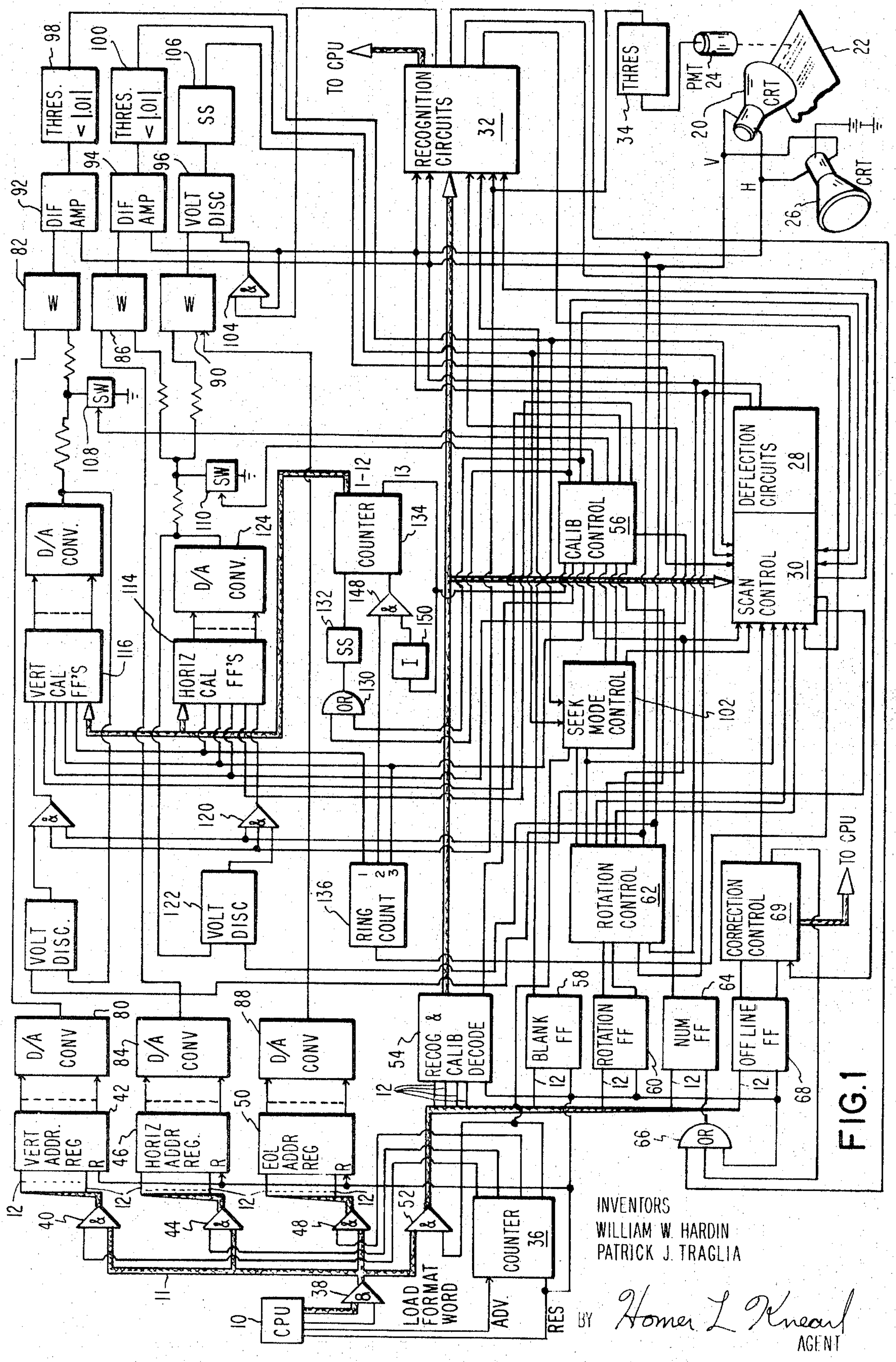
FIG. 1 is a schematic block diagram of a preferred embodiment of the invention.

Referring to FIG. 1, a cathode ray tube scanning system is used to scan documents to be read. Cathode ray tube 20 is a scanner which provides a flying spot to scan the document 22. Light reflected from document 22 is picked up by the photomultiplier tube 24. The purpose of cathode ray tube 26 is to display the scan signals applied to cathode ray tube 20. During contour scanning these scan signals would be displayed on the display cathode ray tube 26 to indicate to a machine operator the shape of the characters being scanned.

To recognize characters on the document 22, the deflection circuits 28 under the control of scan control 30 cause a scanning path over the character to pick up video information to be analyzed by recognition circuits 32. The recognition circuits receive the scan beam position via the horizontal and vertical deflection signals applied to the cathode ray tube scanner 20 and also receive white/black data from a threshold device 34 which digitizes the analog video signal into black or white. All of the above mentioned hardware is well known in the character recognition art and could take on a variety of forms. This hardware is not related to the invention but is merely to be controlled by the invention.

Now examining the apparatus of the invention, reference is made to the left-hand side of FIG. 1 where the format control word is gated into the inventive apparatus. Initially, a reset pulse from a computer 10 resets the counter 36 and other input registers to be discussed. Immediately after the reset of the counter 36, the computer enables AND gate 38 with a load format signal. The load format signal causes the AND gate 38 to pass the control word from central processing unit or computer 10 over a cable 11 having a plurality of individual signal lines 12. In the embodiment shown, the control word is made up of four bytes of eight bits each. The AND gate 38 is the representation for a plurality of AND gates which are enabled to pass a single byte or eight bits at a time.

The first byte of eight bits contains a vertical address corresponding to a vertical start position for scanning a character field or calibration mark. These first eight bits are passed by the AND gate 38 through AND gate 40 and into vertical address register 42 through the individual signal lines 12, as shown in conventional abbreviated form in FIG. 1. The AND gate 40 has been enabled by the count 1 from counter 36. Counter 36 being reset to a count of 1 by the reset signal.

Just prior to the second byte of eight bits, the computer or CPU sends an advance signal to the counter 36. Accordingly, when the second byte of eight bits arrive at AND gate 38, they are passed by AND gate 44 to the horizontal address register 46. This is accomplished because the counter is now at count 2 which enables the AND gate 44. This second byte of eight bits corresponds to the horizontal address of a start of field or calibration mark. Similarly, the third byte of eight bits is passed by AND gate 38 and AND gate 48 to the end of line address register 50. Again the counter 36 was advanced to count three just prior to the arrival of the third byte from the CPU. A count of 3 from counter 36 enables the AND gate 48 to pass the third byte into the end of line address register 50.

These first three bytes or groups of arbitrarily variable binary digits form three binary numbers, after being gated into the registers 42, 46 and 50. Each number, having one of 256 possible values, is available for conversion into a representation of a scan address, as will be described hereinafter. The value to be ascribed to each possible combination of digits in any group is of course purely a design choice; many assignment methods are available in the art. The generation of the binary numbers may be performed by many well-known techniques. Commonly assigned co-pending U.S. patent application Ser. No. 672,550, for instance, shows an apparatus for producing scan-address numbers by an operator positioning a visible strobe on a displayed image of a document to be scanned.

The last or fourth byte from the CPU is passed by AND gate 52 to a variety of locations to be discussed. AND gate 52 is enabled by the fourth count of counter 36. The four count comes up when the computer advances counter 36 just prior to the arrival of the fourth byte at AND gate 38.

Four of the eight bits in the fourth byte are passed through four of the signal lines 12 by AND gate 52 to the recognition and calibration decoder 54. This recognition and calibration decoder will be discussed later in more detail with regard to FIG. 6. The function of the decoder 54 is to decode the four bits into a recognition mode signal which may then be passed by the cable to the recognition circuits 32 and the scan control 30. In this manner, the scan control and recognition circuits may be signaled to operate in a specific recognition mode. One example could be curve follow contour analysis as described in commonly assigned Patent 3,303,465. Some other recognition modes will be mentioned later. The decoder 54 also detects when the format control word has called for a calibration. The calibration signal is passed to the calibration control 56 which controls the calibration of the scanning in the character recognition system each time a document has been indexed under the scanning cathode ray tube 20. The reason for the calibration is that it is difficult to index a document always to the same position. Accordingly, the scan addresses for the cathode ray tube 20 must be adjusted if the document 22 has not been exactly indexed to the position that the scan addresses were based on. The calibration will be discussed shortly in more detail.

Referring again to the fourth byte of the control word, one of the eight bits in the fourth byte is passed to a blank flip-flop 58 which stores the bit. This bit in the control word is passed from the blank flip-flop 58 to the recognition circuits 32 to indicate to the recognition circuits whether or not large blank areas are to be expected during the scanning of the character field. This information can be used by recognition circuits in cooperation with the scan control 30 to scan at high speed through blank areas, rather than use a slower speed detail character scan over all areas of the character field.

Another bit of the eight bits in byte 4 is passed to the rotation flip-flop 60. The rotation flip-flop 60 stores the binary bit. The bit indicates the rotation of the character field to be scanned. For example, a binary bit of 1 would set the rotation flip-flop and indicate that a normal orientation of the characters in the scan field is expected. On the other hand, a binary bit of 0 would cause the flip-flop 60 to remain reset indicating that the character field was oriented 90 degrees or relative to the normal orientation. This rotation information is passed to a rotation control 62 which will be described in more detail later with reference to FIG. 3. The function of the rotation control 62 is to rotate the deflection signals received from deflection circuits 28, 90 degrees and then apply these deflection signals back to the cathode ray tubes 20 and 26 and the scan address circuitry to be described.

Another bit of the eight bits in the fourth byte is passed to the numeric flip-flop 64. The numeric flip-flop stores the bit and passes the information to the recognition circuits 32. The numeric bit tells the recognition circuits whether the character field to be scanned contains either numeric characters or alphabetic characters. In other words, if the numeric flip-flop 64 is set, the character field contains alphabetic characters and if the numeric flip-flop is not set, the character field contains numeric characters. In the specific embodiment shown, the numeric flip-flop 64 is only active during the first character in a character field. This is because the numeric flip-flop is reset by the recognition circuits 32 as soon as the recognition circuits pass the first character to the CPU. Recognition circuits 32 provide a first character identified signal which passes through the OR gate 66 to reset the numeric flip-flop 64.

The last bit of the fourth byte from the CPU is passed from AND gate 52 to the off line flip-flop 68. The off line flip-flop 68 is set by the control word if reject characters detected by the recognition circuits 32 are to be corrected off line. On the other hand, if the off line flip-flop is not set by the control word, rejected characters will be corrected by an observing individual reject characters on cathode ray tube 26 and keying in a character as identified by the machine operator. The correction will be more readily understood by examining the correction control shown in detail in FIG. 5.

Thus, as shown in the conventional standardized notation of FIG. 1, four of the signal lines 12, carrying four bits of the fourth byte, are received by the decoder 54; four additional lines 12, carrying the remaining four of the eight bits of this byte, are received respectively by the flip-flops 58, 60, 64 and 68. Any convenient layout or arrangement of these eight bits may be employed. The fourth byte may likewise be generated in any well-known manner, either manual or automatic.

In summary, it may be clearly seen that the format or control word appearing on cable 11 comprises four serially received bytes of eight parallel bits each, in a standard configuration for data transmission to and from peripheral devices under the control of the central processing unit. The generation, arrangement and ascribed meaning of the control word is immaterial to the operation of the apparatus described herein; these functions may easily be performed by one skilled in the art. Procedures by which control words may be manipulated, stored and transmitted by CPU 10 follow those standard procedures applicable to other peripheral devices. Representative techniques, for instance, are described in Leeds & Weinberg, Computer Programming Fundamentals (2d ed., 1966), pp. 149–191, and in Germain, Programming the IBM 360 (1967), pp. 41–48.

Figure 5:
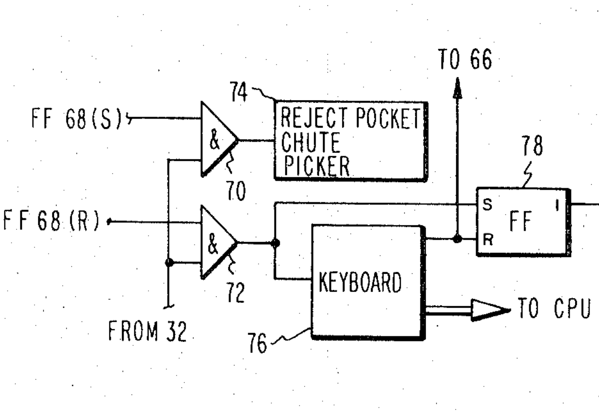
FIG. 5 is a logic block diagram of the correction control shown in FIG. 1.

In FIG. 5, the reject signal from recognition circuits 32 is applied to AND gates 70 and 72. One of the AND gates will be enabled. If correction or reject is to be made off line, then flip-flop 68 (FIG. 1) will be set and AND gate 70 will be enabled. AND gate 70 passes the reject signal to the reject pocket chute picker 74. The picker is not shown but may consist of a solenoid to activate a chute blade which will intercept the document when passed from the scanning station and direct it to a reject pocket.

In the event the flip-flop 68 is reset, indicating the correction is to be made on line, AND gate 72 is enabled and passes the reject signal to enable the keyboard 76.

In addition the output from AND gate 72 sets the flip-flop 78. Flip-flop 78 when set signals the scan control 30 to rescan the rejected character. The rescanning of the character will continue until the operator observing the display 26 keys in a substitute character for the rejected character. The keyed in character is passed from the keyboard directly to the CPU. In addition, when the operator hits the key on the keyboard, the keyboard signals the flip-flop 78 to reset and thereby stops the rescanning action control by scan control 30. The reset signal from keyboard 76 is also passed to OR gate 66 in FIG. 1 to reset the numeric flip-flop 64. The purpose of this reset is to reset the flip-flop 64 in the event the first character in a field is a reject character.

Referring again to FIG. 1, the scan address circuitry will now be described. The vertical address in the register 42 is converted into an analog voltage by the DA converter 80. This analog voltage is then passed to the summing circuit 82 which sums the address analog voltage with a correction analog voltage. The correction analog voltage is the voltage that calibrates the scanner to the physical position of the document under the flying spot scanner. The error calibration signal applied to summer 82 is from the vertical calibration portion of the calibrate circuits.

The horizontal address in address register 46 is converted into an analop voltage by the DA converter 84. This analog voltage is applied to the summing network 86 which functions just as the summing circuit 82 except that the calibration voltage applied to the summing circuit 86 is from the horizontal calibration circuits which will be discussed shortly. The end of line (horizontal line) from address register 50 is converted to an analog voltage by the DA converter 88. The DA converter 88 passes its analog voltage to the summing network 90 which also receives its error calibration signal from the horizontal calibration circuits.

For the moment, assuming that the calibration voltages have been determined and applied to the summing networks 82, 86 and 90, then the corrected scan addresses and analog voltages will appear at the output of these summing networks and be applied to the difference amplifiers 92, and 94 and the voltage discriminator 96. Specifically, the vertical corrected address voltage is applied to difference amplifier 92 while the horizontal corrected address voltage is applied to difference amplifier 94. The difference amplifier 92 also receives the vertical deflection signal as applied to the cathode ray tubes 20 and 26 from the rotation control 62. The difference amplifier 94 also receives the horizontal deflection signal as applied to the cathode ray tubes from the rotation control 62. The difference amplifiers then indicate a difference signal which corresponds to the separation between the present horizontal and vertical position of the scanning beam with an addressed position as specified by the vertical address register 42 and the horizontal address register 46. A threshold circuit 98 monitors the difference output from difference amplifier 92 while a similar threshold circuit 100 monitors the difference output from difference amplifier 94. The thresholds 98 and 100 have an output every time the deflection signals are within 1/100 of a volt of the vertical and horizontal scan addresses out of summing networks 82 and 86. In other words, every time the vertical deflection on cathode ray tube 20 is very near the vertical address voltage from summing network 82 the threshold 98 has an output. Threshold 100 works similarly for the horizontal deflection voltages. The outputs from the thresholds 98 and 100 are passed back to the scan control 30 so that the scan control will know when the scanning beam is near an addressed position. The threshold signals are also passed back to the seek mode control 102.

The function of the seek mode control 102 to drive its horizontal and vertical deflection circuits until they reach a horizontal and vertical address as indicated by the threshold circuits 98 and 100. The specific operation of the seek mode control 102 will be described in detail later with reference to FIG. 2.

Referring again to the upper righthand corner of FIG. 1, the voltage discriminator 96 operates off of the end of line address voltage out of summing network 90. The voltage discriminator 96 also receives the horizontal deflection signals out of rotation control 62 via AND gate 104. AND gate 104 is enabled by the recognition circuits when the recognition of a character is not in process. If recognition of a character were in process, the AND gate 104 inhibits the passage of the horizontal deflection signal to the voltage discriminator 96 until the recognition of the character is complete. The voltage discriminator 96 has an output when the horizontal deflection signal exceeds the end of line address voltage from the summing network 90. This end of line signal is converted to a pulse by the singleshot 106 and passed back to the scan control 30 to indicate to the scan control that the line addressed has been completely scanned. The scan control could then direct the deflection circuits to operate in an aging mode until directed to scan a new line by a new format control word being gated into the apparatus.

Now referring to the center upper portion of FIG. 1, the calibration of the scan address to the position of a document will be described. When calibration is necessary, calibration control 56, which will be described shortly in detail with reference to FIG. 4, generates control signals to select which dimension of the calibration is to be accomplished first, horizontal or vertical, and also to control the clamping of the error correction input to the summing networks 82, 86 and 90 to ground while the calibration is taking place. The clamping is accomplished by switches 108 and 110 being conductive while the calibration of the dimension with which they are associated is taking place. The switches shown in FIG. 1 are controlled by the calibration control 56.

Figure 8:
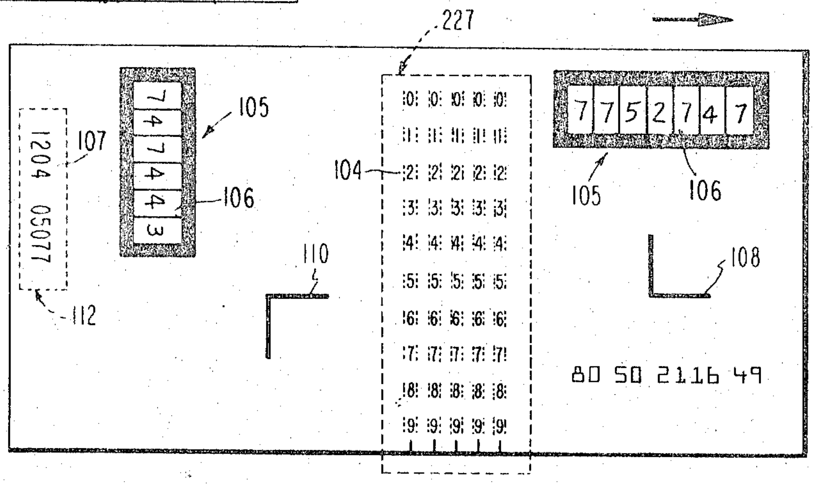
FIG. 8 is a sample document to be scanned with various format situations shown thereon.

Referring to FIG. 8, a sample document is shown with two calibration marks 108 and 110 thereon. The orientation of the calibration mark 108 is for normal horizontal scanning of the sample document in FIG. 8. The calibration mark 110 is for calibration when scanning for vertical oriented characters as shown in field 112. The calibration mark 110 is therefore rotated plus 90 degrees relative to the calibration mark 108. To rotate the scanning by 90 degrees the rotation control 62 in FIG. 1 will switch the horizontal deflection signal from the deflection circuits 28 to the vertical deflection plates of the cathode ray tube 20 and 26. Also, the rotation control 62 will invert the vertical deflection signal from circuits 28 and apply it to the horizontal plates of the cathode ray tubes 20 and 26. The manner in which this is accomplished will be discussed in detail with reference to FIG. 3 shortly.

The importance at this point is that the deflection signals as applied to the cathode ray tubes 20 and 26 and to the scanning addresses and calibrating circuit may be rotated by the rotation control 62. Therefore, it is necessary to select which calibration will be done first as it is desirable to always calibrate in the dimension transverse to the movement of the document. This is desirable because a grossly misregistered document may readily be detected during the calibration operation if the scanning beam does not intercept the leg of the calibration mark transverse to the movement of the document.

Referring again to FIG. 8, is can be seen that to calibrate on the normal calibration mark 108, it is desirable to first calibrate the horizontal dimension before calibrating the vertical dimension. On the other hand when operating in the plus 90 rotated mode as in calibration mark 110, the vertical deflection signals will now intercept the leg of the mark transverse to the indexed motion of the document. Accordingly, it is desirable to calibrate the vertical dimension first and then the horizontal dimension when working in the plus 90 rotated orientation. Therefore the calibration control 56 has an output signal to enable the horizontal calibration flip-flop 114 first when operating in the normal mode and a signal to enable the vertical calibration flip-flops 116 first when operating in the plus 90 rotated mode.

Figure 7:
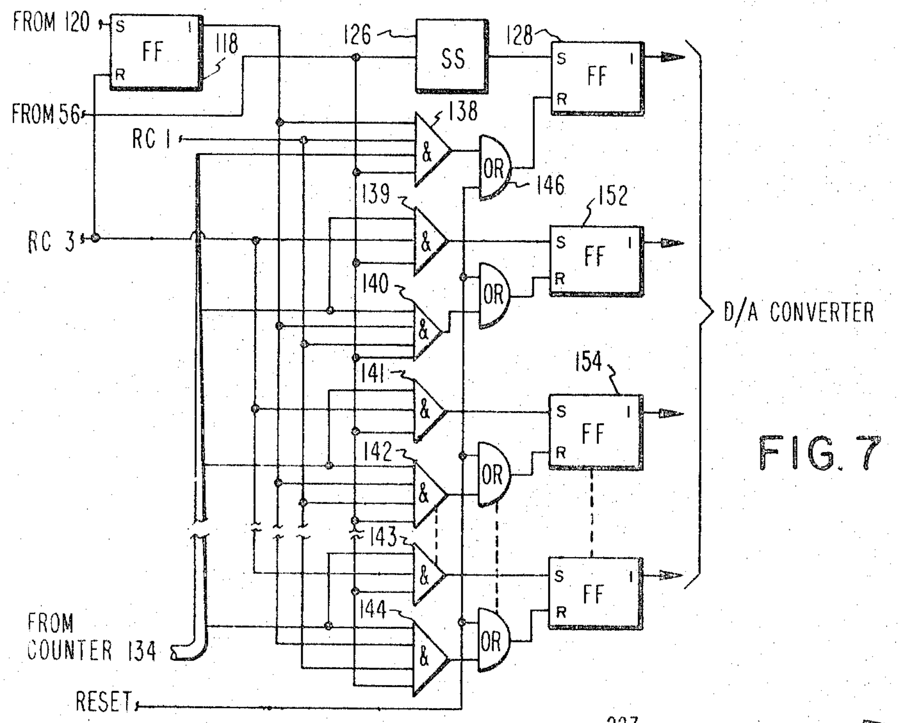
FIG. 7 is a logic block diagram of the calibration flip-flops either horizontal or vertical shown in FIG. 1.

The calibration in each dimension is accomplished in the same manner and will be discussed only with reference to the horizontal dimension. Assuming that the format control word has been decoded by the decoder 54 to indicate that a calibration is necessary, a calibrate signal is sent to the calibration control 56 to start the operation. In the meantime, the approximate address of the calibration mark has been loaded into the vertical address registers 42 and the hroizontal address register 46. At byte 4 count the seek mode control 102 causes the scan control 30 to seek to the address specified by the vertical address register 42 and horizontal address register 46. Just prior to the seek operation, the calibration control 56 causes the switches 108 and 110 to clamp the error correction point on the summing amplifiers 82 and 86 to ground. Accordingly, the only voltage applied to the difference amplifiers 92 and 94 will be the addressed voltage. The threshold devices 98 and 100 then have outputs when the deflection circuits reach the address position of the calibration mark. The calibration control then signals the scan control 30 to start a series of twelve horizontal scans through the vertical leg of the calibration mark 108 (FIG. 8). The operation of the calibration apparatus is a fractional approximation system taking smaller and smaller increments until a trial error voltage has zeroed in on the vertical voltage difference represented by the address position of the calibration mark and the actual position of the calibration mark. The operation of the calibration is probably best understood by referring simultaneously to FIG. 1 and FIG. 7 shows the details of the calibration flip-flops either horizontal or vertical. Assuming the calibration flip-flops in FIG. 7 are the horizontal calibration flip-flops then the input flip-flop 118 receives its set signal from AND gate 120 (FIG. 1). AND gate 120 has three inputs. One is from the scan control and is up every time the scan control is sweeping left. Since the address of the calibration mark will be directed to a point inside the 90 degree angle formed by the calibration mark this means the AND gate 120 is up each time the horizontal scanning beam sweeps left from the scan address point towards the vertical leg of the calibration mark 108 (FIG. 8). Another input to the AND gate 120 is from the threshold 34. This input will be up each time the threshold 34 indicates that the scanning beam is on black, i.e., the scanning beam is crossing the calibration mark. The last input to the AND gate 120 is from the voltage discriminator 122. The output of the voltage discriminator 122 will be up when the error calibration voltage out of the D/A converter 124 is below the horizontal deflection voltage.

The calibration operation begins by the calibration control 56 having an output signal which comes up and fires the singleshot 126 in FIG. 7. Singleshot 126 sets flip-flop 128. At the same time the calibration control 56 passes a signal to OR gate 130 which activates singleshot 132 to reset the counter 134 to count 1. The counts from counter 134 are passed to the calibrate flip-flops for the purpose of successively enabling logic connected to these flip-flops.

As each calibration flip-flop is set, it activates the D/A converter to apply an output voltage. These voltages from the activation of each flip-flop are added at a summing point in the D/A converter. Also, each flip-flop as they are successively operated adds in a smaller fractional increment of voltage. The first flip-flop 128 would add in an increment of one-half of the error voltage range. Successive flip-flop would add in increments of one-quarter, one-eighth, one-sixteenth, etc., down to the last of twelfth flip-flop. When flip-flop 128 is energized by the calibration control, it therefore produces a voltage at the output of the D/A converter 124 which divides the error range for the calibration mark into two equal pieces. As the scan control drives the deflections horizontally to the left to make the first calibration sweep, the voltage discriminator 122 will have an output until the deflection voltage exceeds one-half of the error voltage. If while the voltage discriminator 122 has an up output, the calibration mark is intercepted and AND gate 120 will have an output pulse. The output pulse from AND gate 120 will set the flip-flop 118. Flip-flop 118 stores the fact that during the horizontal going left scan, the calibration mark was intercepted prior to crossing the error voltage out of the D/A converter 124. The scan control directs the flying spot to go left through the entire error range and then causes the flying spot to reverse its direction and return to the initial scan address point.

The reversing of direction of the scanning beam is also a signal which is passed by the scan control 30 to the ring counter 136 in FIG. 1. Thus as the scan control 30 directs the flying spot to fly back to the initial scan point, the ring counter 136 counts through its three counts. The first count is passed to the calibration flip-flops and is applied to AND gates 138, 140, 142 and 144. These same AND gates also receive a conditioning signal from the calibration control 56 so that only either the horizontal calibration flip-flops or the vertical calibration flip-flops 116 will be activated but not both simultaneously. The AND gates also receive a conditioning input from the set side of flip-flop 118. The AND gates also receive conditioning inputs from successive counts of the counter 134, AND gate 138 being conditioned by count 1, AND gate 140 being conditioned by count 2, AND gate 142 being conditioned by count 3, etc. Accordingly, AND gate 138 would have an output at ring counter 1 time after the first horizontal scan through the calibration mark if the flip-flop 118 has been set by AND gate 120. As previously pointed out, flip-flop 118 is set if the error calibration voltage is greater than the voltage difference between the scan address position for the calibration mark and the actual position of the calibration mark. Assuming the flip-flop 118 was set then AND gate 138 will have an output pulse which is passed by OR gate 146 to reset the flip-flop 128. The other input to the OR gate 146 is a general reset signal which occurs just prior to seek mode control when a calibrate condition has been decoded by decoder 54.

At ring count 2 time, the counter is advanced by the count 2 signal being passed via AND gate 148 (FIG. 1). The AND gate 148 is enabled to pass the ring count 2 from ring counter 136 until the counter 134 reaches a count of 13 at which time the inverter 150 no longer has an output pulse to enable the AND gate 148. Thus, the counter 134 will be advanced up to a count of 13 and then held there until reset by an output pulse from singleshot 132. At ring count 3, the calibration flip-flops begin a new cycle of approximation for the error voltage. The ring count 3 is applied to the AND gates 139, 141 and 143. These AND gates are also conditioned by control signal from calibration control 56 and by successive counts from counter 134. The counter 134 is now at count 2 so ring count 3 will cause AND gate 139 to have an output which will set the flip-flop 152. Flip-flop 152 will then cause the D/A converter to have a one-quarter error voltage increment added on to the previous one-half error voltage increment if it were present. However, since the flip-flop 128 was reset, the one-half error voltage increment is not present and the output of the D/A converter is a one-quarter error voltage increment. This one-quarter error voltage increment is passed back to the voltage discriminator 122 which will have an output voltage which is up as the scan control directs the scanning beam to make the second horizontal scan left toward the calibration mark from the initial scan address. Of course, the voltage discriminator has an output only for the first one-quarter of that scan left. If the calibration mark is further left than one-quarter than the error voltage, then the AND gate 120 will not have an output during the second horizontal going left scan, and the flip-flop 118 will not be set. The flip-flop 118 has been reset after the first scan by the ring count 3 which caused the setting of flip-flop 152. After the second horizontal scan through the calibration mark is completed and the scanning beam is directed back to the initial scan address point, the ring counter 136 is again activated. At ring count 1, the condition of flip-flop 118 is sampled by AND gate 140 and found not to be set. Accordingly, the flip-flop 152 remains set in the one-quarter error voltage increment continues to be on the output of the D/A converter 124. At ring count 2, the counter 134 is advanced to count 3. At ring count 3, the flip-flop 118 is reset and AND gate 141 has an output pulse which sets flip-flop 154. Flip-flop 154 then causes a one-eighth error voltage increment to be added to the one-fourth error voltage increment already on the output of the D/A converter 124.

This operation of adding successive increments and removing these increments if too large is repeated for twelve scans. When the counter 134 is advanced to the thirteenth count, it signals calibration control 56 that calibration is complete for one dimension—in this case the horizontal deflection. The calibration control then activates the vertical calibration flip-flops 116 and resets the counter 134 via OR gate 130. The above procedure then repeats for the vertical calibration flip-flops 116. Of course, during vertical calibration, the scanning beam is directed by scan control to go vertically down through the arm of the calibration mark parallel to the movement of the document. Control signals from the calibration control 56 convey to the scan control 30 when it is to make horizontal scans for calibration and vertical scans for calibration. This completes the description of FIG. 1.

Figure 3:
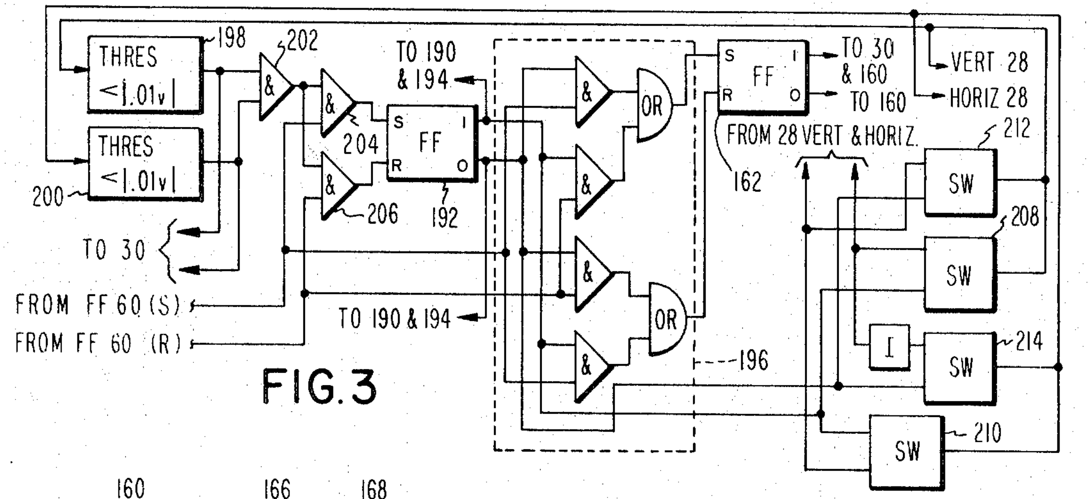
FIG. 3 is a logic block diagram of the rotation control shown in FIG. 1.
Figure 2:
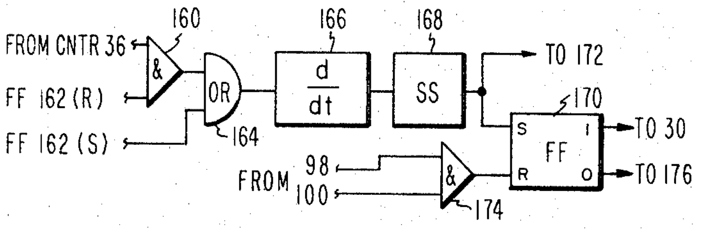
FIG. 2 is a logic block diagram of the seek mode control shown in FIG. 1.
Figure 4:
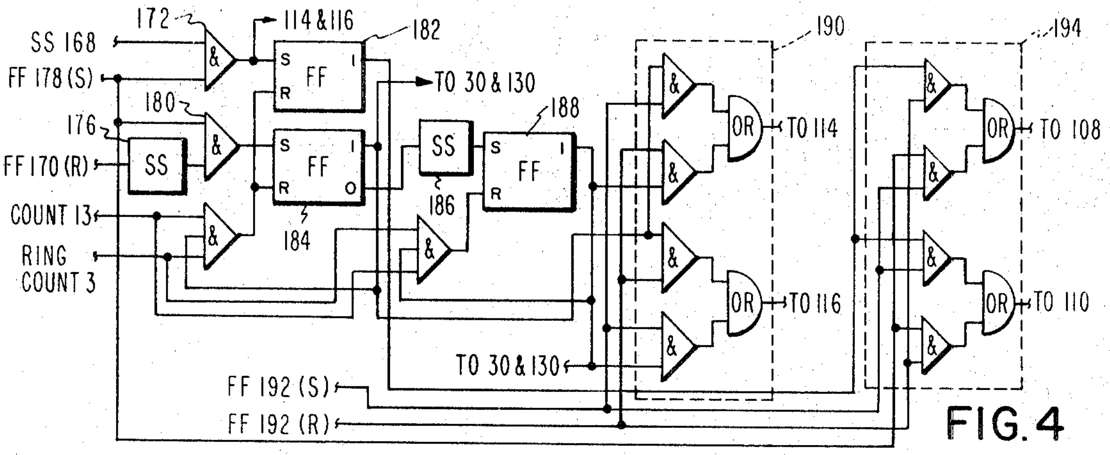
FIG. 4 is a logic block diagram of the calibration control shown in FIG. 1.

Reference is now made to FIG. 2 where the details of the seek mode control 102 (FIG. 1) are shown. The purpose of the seek mode control is to signal scan control 30 to seek to a scan address as specified in the registers 42 and 46 (FIG. 1). This operation will be necessary each time a new format control word is gated into the registers. One limitation on entering the seek mode is that it should not be entered until after the rotation control 62 (FIG. 1) has completed its operation. Accordingly, in FIG. 2 the seek mode receives a count 4 signal from counter 36 (FIG. 1) and from the reset side of flip-flop 162, in the rotation control shown in FIG. 3. Flip-flop 162 is reset when rotation is not in process and set when rotation is in process. Accordingly, AND gate 160 in FIG. 2 has an output during count 4 if flip-flop 162 is reset. This signal from AND gate 160 is passed via OR gate 164 to the differentiator 166 of the differentiator and singleshot combination 166 and 168 respectively. The function of the differentiator 166 and singleshot 168 is to generate a pulse at the time of the trailing edge of the count 4 from counter 36. The computer advances the counter 36 out of count 4 as soon as the fourth byte of the control word is loaded into the appropriate registers via AND gate 52 (FIG. 1). Referring again to FIG. 2, the OR gate 164 also receives an input from the set side of flip-flop 162 in the rotation control (FIG. 3). Therefore the differentiator 166 and singleshot 168 will also produce an output pulse when flip-flop 162 is reset as this represents the trailing edge of the signal from the set side of flip-flop 162. The output from singleshot 168 sets the seek flip-flop 170. To summarize, the seek flip-flop 170 is set either at the end of the count 4 from counter 36 after the format control has been loaded or at the end of rotation if a rotation has been commanded by the control word. The output from singleshot 168 is also passed to AND gate 172 in the calibration control (FIG. 4).

To reset the seek flip-flop 170, AND gate 174 monitors the output from thresholds 98 and 100 in FIG. 1. When these thresholds are both satisfied, the AND gate 174 has an output pulse which resets the seek flip-flop 170. The thresholds will not be satisfied until the scan control has moved the flying spot scanner to the address specified in the address registers. The reset side of the seek flip-flop is passed to the singleshot 176 in the calibration control in FIG. 4. Once calibrated and addressed to the proper character-field coordinates, scan control 30 will execute a repetitive series of recognition scans over the spaces 104, 106 or 107 of fields 227, 105 or 112 in the conventional manner, by scanning a first space, automatically incrementing a predetermined distance to a second character space, and so on. An example of such a scanner is disclosed in commonly assigned co-pending U.S. patent application Ser. No. 619,226. The recognition scans continue over further character spaces until terminated by the end-of-line pulse from single-shot 106, as hereinbefore described.

Now referring to FIG. 4, the details of the calibration control will be described. If a calibration signal has been decoded by the decoder 56 flip-flop 178 of decoder 56 (FIG. 6) will have been set. The set condition from flip-flop 178 is applied to the AND gate 172 and to AND gate 180. At the start of seek, AND gate 172 has an output pulse from singleshot 168 and seek mode control (FIG. 2) which sets flip-flop 182. The output from flip-flop 182 is operated on by logic as will be described to control the switches 108 and 110 (FIG. 1) which clamp the error calibration voltage to ground during calibration. AND gate 180 which also responds to the calibrate signal will have an output at the end of seek since the singleshot 176 is triggered by the seek flip-flop 170 (FIG. 2) being reset. The output from AND gate 180 sets the scan 1 flip-flop 184. The scan 1 flip-flop remains set so long as the first dimensional calibration is taking place. The scan 1 signal is passed to the scan control 30 to generate the scan operation and to the OR gate 130 to start the counter 134 (FIG. 1). Scan 1 is reset at count 13 and ring count 3 which corresponds to the end of the first dimensional calibration. This causes the scan control to stop the first dimensional calibration scans.

The resetting of flip-flop 184 causes singleshot 186 to have an output pulse to set the scan 2 flip-flop 188. The scan 2 flip-flop signal is sent to the scan control to initiate scan 2 operation for the second dimensional calibration and also to the OR gate 130 to reset the counter 134. Scan 2 flip-flop 188 is reset by count 13 and ring count 3 respectively from counter 134 and ring counter 136. Thus, scan 2 flip-flop is reset at the end of the second dimensional calibration. The scan 1 and scan 2 signals from flip-flops 184 and 188 are also used to select which calibration latches will be operated first, i.e., which dimension which will be calibrated first. As previously explained, this depends upon the rotation of the calibration mark. This rotation information and the scan 1 and scan 2 signals are applied to the logic 190 in FIG. 4 along with rotation information from flip-flop 192 (FIG. 3) in rotation control. In normal rotation the logic 190 activates the horizontal calibration flip-flops during scan 1 and the vertical calibration flip-flop during scan 2. In plus 90 rotation, the logic 190 activates the vertical calibration flip-flops during scan 1 and the horizontal calibration flip-flops during scan 2.

The logic circuitry 194 in FIG. 4 uses the set output from flip-flop 182 and the calibrate signal along with rotation information to control the operation of switches 108 and 110 in FIG. 1. A signal from flip-flop 182 is present from the beginning of seek until scan 1 of calibration is completed. The calibrate signal is up until a new format control word is gated in. Logic 194, if the rotation is normal, holds switch 110 conductive and thus clamps the error calibration voltage to ground until horizontal calibration is completed. In normal rotation the switch 108 is conductive holding the vertical calibration error voltage clamp to ground until the next format control word is gated in. If the rotation is plus 90, the time sequencing and the switches 108 and 110 is reversed.

Now referring to FIG. 3, the rotation control will be described in detail. Flip-flop 192 stores the present rotation condition of the character recognition system. The rotation command from flip-flop 60 is applied to logic 196 along with the present rotation status from flip-flop 192. If the rotation status is different from the rotation command, flip-flop 162 is set. The set condition in flip-flop 162 is passed to the scan control 30 to cause the scan control to direct the scanning beam to zero deflection voltage. When the deflection voltages reach 0, threshold detectors 198 and 200 will each have an output. These outputs are passed back to the scan control 30 to tell the scan control when the horizontal and vertical deflection voltages have reached 0. When the deflection voltages are both at 0, AND gate 202 has an output which enables AND gates 204 and 206. AND gates 204 and 206 load the rotation command from flip-flop 60 into flip-flop 192. The rotation status in flip-flop 192 is used to control the switches which physically accomplish the rotation of the deflection signals received from the deflection circuits 28. The change in rotation is made as the scanning beam moves through 0 deflection voltage so as to reduce application of transient to the deflection plates of the cathode ray tube.

In normal rotation, switches 208 and 210 are operated to pass the vertical and horizontal deflection signals straight through. In plus 90 rotation, switches 212 and 214 are operative. In this case the horizontal output voltage is actually the vertical input deflection voltage from the deflection circuits 28, while the output vertical voltage is actually the inverted horizontal deflection voltage from deflection circuits 28. This will cause the scanning to rotate plus 90 degrees and therefore enable it to scan characters which are rotated plus 90 degrees.

Figure 6:
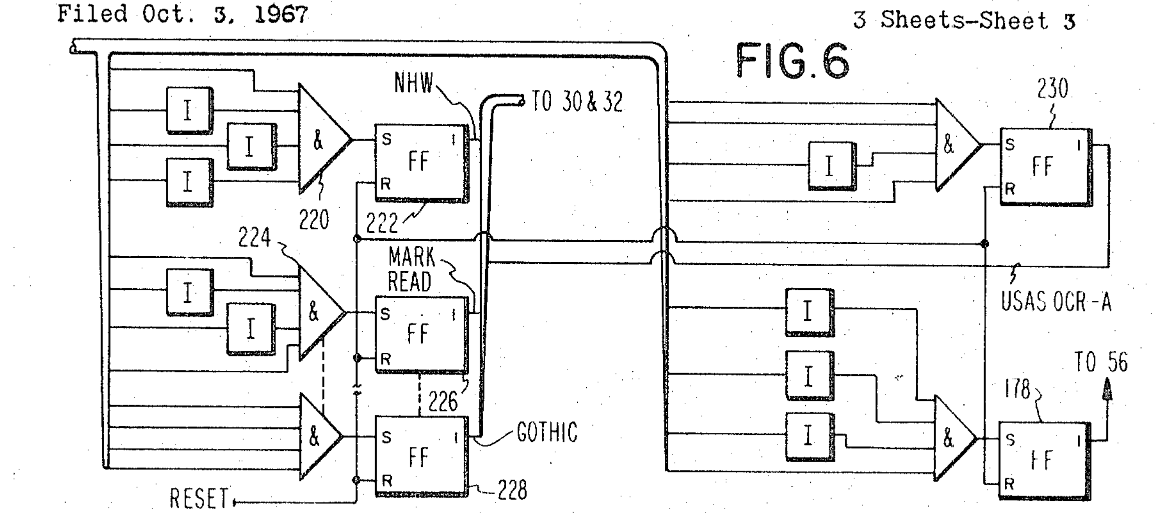
FIG. 6 is a logic block diagram of the recognition and calibrate decoder shown in FIG. 1.

Reference is now made to FIG. 6 where portions of the recognition and calibrate decoder 54 (FIG. 1) are shown. The calibrate decoder is merely operating on the four bits in the fourth byte that it receives. For example, if the four bits are up, down, down and down, AND gate 220 in FIG. 6 is satisfied and flip-flop 222 is set. If flip-flop 222 is set, the recognition scanning in recognition mode will be numeric handwriting. This signal is passed to the scan control 30 and the recognition circuits 32 where they are operated in a recognition mode as described in commonly assigned Patent 3,303,465.

AND gate 224 in FIG. 6 has an output if the input bytes in the format control word are up, down, down, up. This pattern of bits will cause flip-flop 226 to be set and flip-flop 226 could be indicative of mark read scanning and recognition. The mark read signal would then be passed to the scan control 30 and recognition circuits 32. Portion 227 of the sample document in FIG. 8 shows an area which is to be mark read. Flip-flops 228 and 230 would be similarly activated for respective inputs codes of all up and up, up, down up. A set condition in flip-flop 228 could indicate Gothic print to be scanned and recognized and a set condition in flip-flop 230 could indicate USAS OCR—A font to be scanned and recognized. Finally, the flip-flop 178 is the calibrate flip-flop which would be activated by a four bit code in the control word of down, down, down up. As can be seen in FIG. 6, the decoder has the capability of handling 15 different recognition mode control signals plus the calibrate signal. Of course, with a longer control word and more decoding logic the recognition modes could be increased.

While the invention has been particularly shown and described with reference to a preferred embodiment thereof, it will be understood by those skilled in the art that various changes in form and details may be made therein without departing from the spirit and scope of the invention.

What is claimed is:

1. Format apparatus for controlling the operation of a character-recognition system including a scanner for deflecting a scanning beam in a plurality of scan patterns at controllable locations on a document having a plurality of character spaces, and including a recognition unit for classifying input characters on said document in accordance with a defined set of reference characters by means of detected reflections of said beam from said document, said format apparatus comprising:

receiving means for accepting a string of arbitrarily variable binary digits, which, taken together, comprise a control word;

a plurality of storage means;

gating means coupled to said receiving means for identifying a plurality of groups of said binary digits in said control word and for entering said groups into respective ones of said storage means;

seek-mode control means coupled to said gating means for generating a seek signal;

scan-control means coupled to said storage means and to said scanner for moving said scanning beam to one of said controllable locations in response to said seek signal, said one location being determined by at least a first of said stored binary-digit groups, said scan-control means thereafter being operable to move said scanning beam automatically in repetitive recognition-scan patterns over a plurality of said character spaces;

decoding means coupled to said storage means for generating a plurality of recognition-control signals from at least one of said binary digit groups; and means for applying said recognition-control signals to said recognition unit so as to select one of a plurality of subsets of said reference-character set for classifying said input characters.

2. An apparatus according to claim 1, further comprising means for generating a first position signal from said first binary-digit group, means for comparing said position signal with a deflection signal indicative of the position of said scanning beam, and means for producing a first comparison signal when said position signal bears a predetermined relationship to said deflection signal; and wherein said scan-control means is responsive to said seek signal to initiate the motion of said scanning beam to said first location, and is responsive to said comparison signal to terminate said beam motion and to initiate said recognition-scan pattterns.

3. An apparatus according to claim 2, further comprising means for generating a second position signal from a second of said binary-digit groups, means for comparing said second position signal with a deflection signal indicative of the position of said scanning beam, and means for producing a second comparison signal when said second position signal bears a predetermined relationship to said last-named deflection signal; and wherein said scan-control means is further responsive to said second comparison signal to terminate said recognition-scan patterns.

4. An apparatus according to claim 3, further comprising means for generating a third position signal from a third of said binary-digit groups, means for comparing said third position signal with a deflection signal indicative of the position of said scanning beam, and means for producing a third comparison signal when said third position signal hears a predetermined relationship to said last-named deflection signal; and wherein said scan-control means is further responsive to both said first and said third comparison signals to terminate said beam motion and to initiate said recognition-scan patterns.

5. An apparatus according to claim 4, wherein said means for generating said position signals comprise a plurality of digital-to-analog converters.

6. An apparatus according to claim 3, wherein said receiving means comprises means for accepting said groups serially and for accepting said binary digits of each said group in parallel, means for counting said groups to produce a plurality of count signals, AND-gating means coupled between said receiving means and said storage means and responsive to different ones of said count signals for entering said groups into said respective ones of said storage means.

7. An apparatus according to claim 2, further comprising means for storing a calibration signal indicative of an error magnitude, and means for combining said calibration signal with a representation of said first binary-digit group so as to correct said one controllable location.

8. An apparatus according to claim 7, further comprising means for extracting a calibration-control signal from said control word, and means responsive to said calibration-control signal for generating said calibration signal.

9. An apparatus according to claim 1, wherein each of said plurality of subsets identifies a predetermined font of said reference-character set.

10. An apparatus according to claim 9, wherein one of said recognition-control signals is a numeric signal for selecting between alphabetic and numeric subsets of said reference-character set.

11. An apparatus according to claim 1, wherein one of said recognition-control signals is a blank-control signal for enabling said recognition unit to identify blank spaces in character fields on said document.

12. An apparatus according to claim 1, further comprising means for orienting said scan patterns in any of a plurality of directions in response to a rotation signal; and wherein said decoding means includes means for extracting said rotation signal from said control word.

13. An apparatus according to claim 1, further comprising means for displaying a rejected character in response to an on-line correction signal, means for ejecting a document containing a rejected character in response to an off-line correction signal; and wherein said decoding means includes means for extracting said on-line and said off-line correction signals from said control word.

14. A method for controlling a character-recognition system having a relocatable scanning means and a recognition means, said method comprising the steps of:

(a) receiving a format-control word having a plurality of selectable binary digits;

(b) separating said word into a plurality of groups of said digits;

(c) producing first and second coordinate representations from at least two of said groups;

(d) producing a recognition-control signal from at least one of said groups and applying said control signal to said recognition means so as to select among a plurality of sets of recognizable characters;

(c) relocating said scanning means to a position specified by said first coordinate representation;

(f) executing a recognition scan over a character space determined from said position;

(g) sensing a signal resulting from said recognition scan and therewith recognizing the contents of said character space as being a particular member of a set selected by said recognition-control signal;

(h) relocating at least one coordinate of said character space by a predetermined amount;

(i) comparing said one cooordinte with said second-coordinate representation to develop a comparison signal;

(j) branching to step (f) if said comparison signal has a first value; and (k) terminating said recognition scan if said comparison signal has other than said first value.

15. A method according to claim 14, wherein said scanning means is adapted to produce a movable scanning beam and at least one deflection signal indicative of a coordinate of said beam; and wherein step (e) comprises the substeps of:

(l) sensing a signal indicative of the receipt of a predetermined portion of said control word;

(m) comparing said deflection signal with said first-coordinate representation;

(n) initiating a seek-scan pattern of said scanning beam in response to said receipt signal; and (o) disabling said seek-scan pattern when said deflection signal bears a predetermined relationship to said first-coordinate representation.

16. A method according to claim 15, wherein step (a) comprises the substeps of:

(p) generating a count signal;

(q) receiving a portion of said control word;

(r) gating said portion into a corresponding one of a plurality of storage means;

(s) generating said receipt signal if said count signal has a predetermined value;

(t) incrementing said count signal; and (u) branching to substep (q) until all of said control word has been received.

References Cited

UNITED STATES PATENTS

| | | | |
|---|---|---|---|
| 3,202,965 | 8/1965 | Nadler | 340—146.3 |
| 3,271,738 | 9/1966 | Kamentsky | 340—146.3 |
| 3,381,274 | 4/1968 | Quade et al. | 340—146.3 |
| 3,445,598 | 5/1969 | Green et al. | 178—7.1 |

OTHER REFERENCES

A Generalized Scanner for Pattern and Character-Recognition Studies, Highleyman and Kamentsky (1959).

Computer-Automated Design of Multifont Print Recognition Logic, Kamentsky and Liu.

MAYNARD R. WILBUR, Primary Examiner

W. W. COCHRAN II, Assistant Examiner